Jan. 10, 1961 L. W. WATERS 2,967,554
PEACH PITTER
Filed Feb. 21, 1957 6 Sheets-Sheet 1
FIG_1
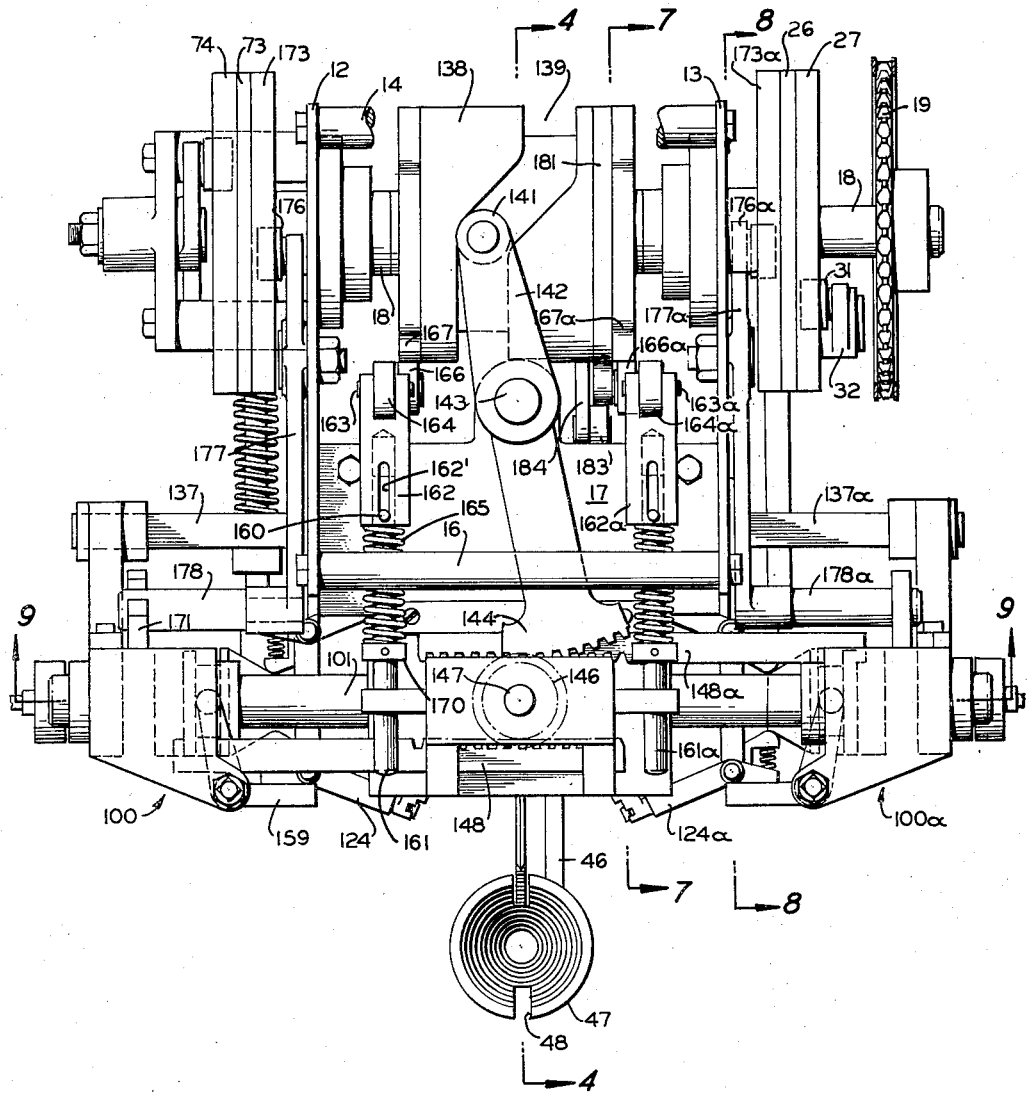
INVENTOR.
LAWRENCE W. WATERS
BY
Mellin and Hanscom
ATTORNEYS Jan. 10, 1961 L. W. WATERS 2,967,554
PEACH PITTER
Filed Feb. 21, 1957 6 Sheets-Sheet 2
FIG_2
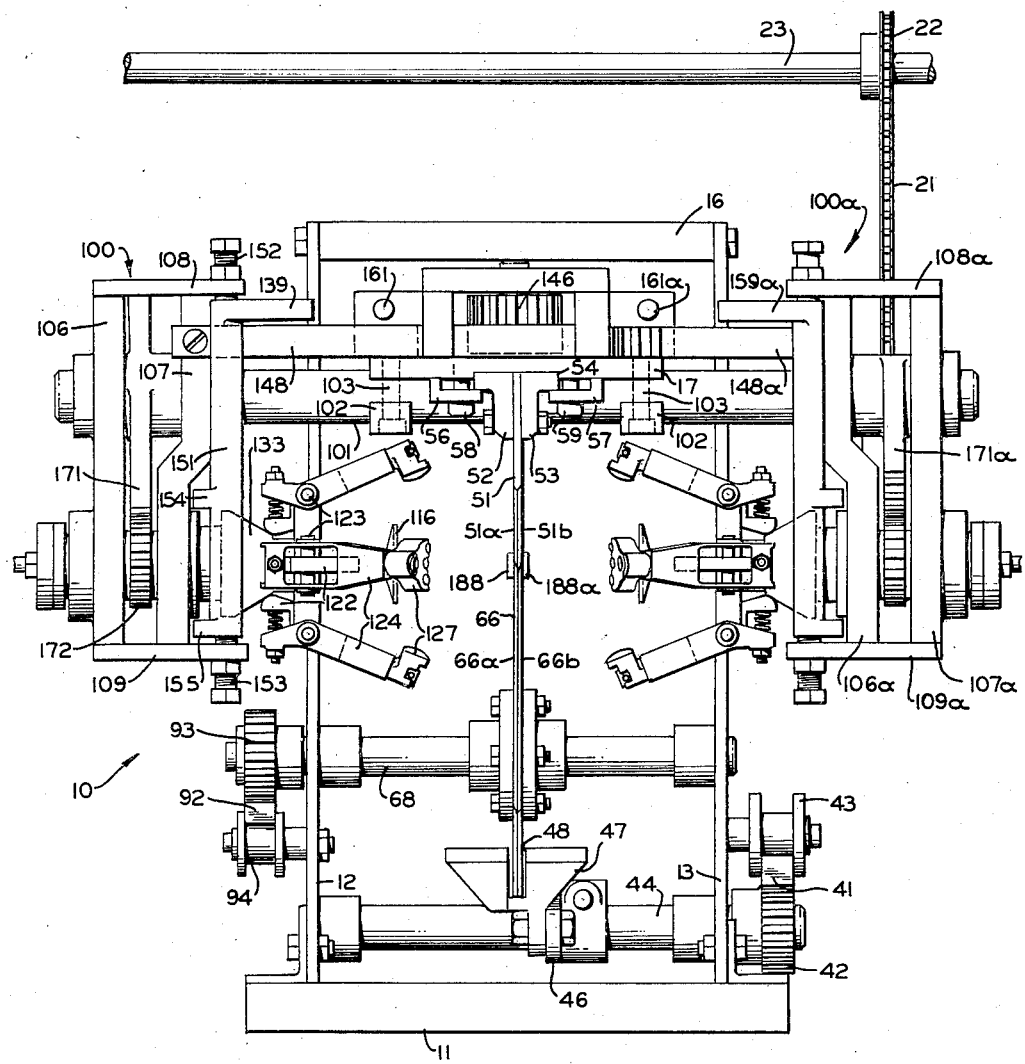
INVENTOR.
LAWRENCE W. WATERS
BY
Mellin and Hanscom
ATTORNEYS

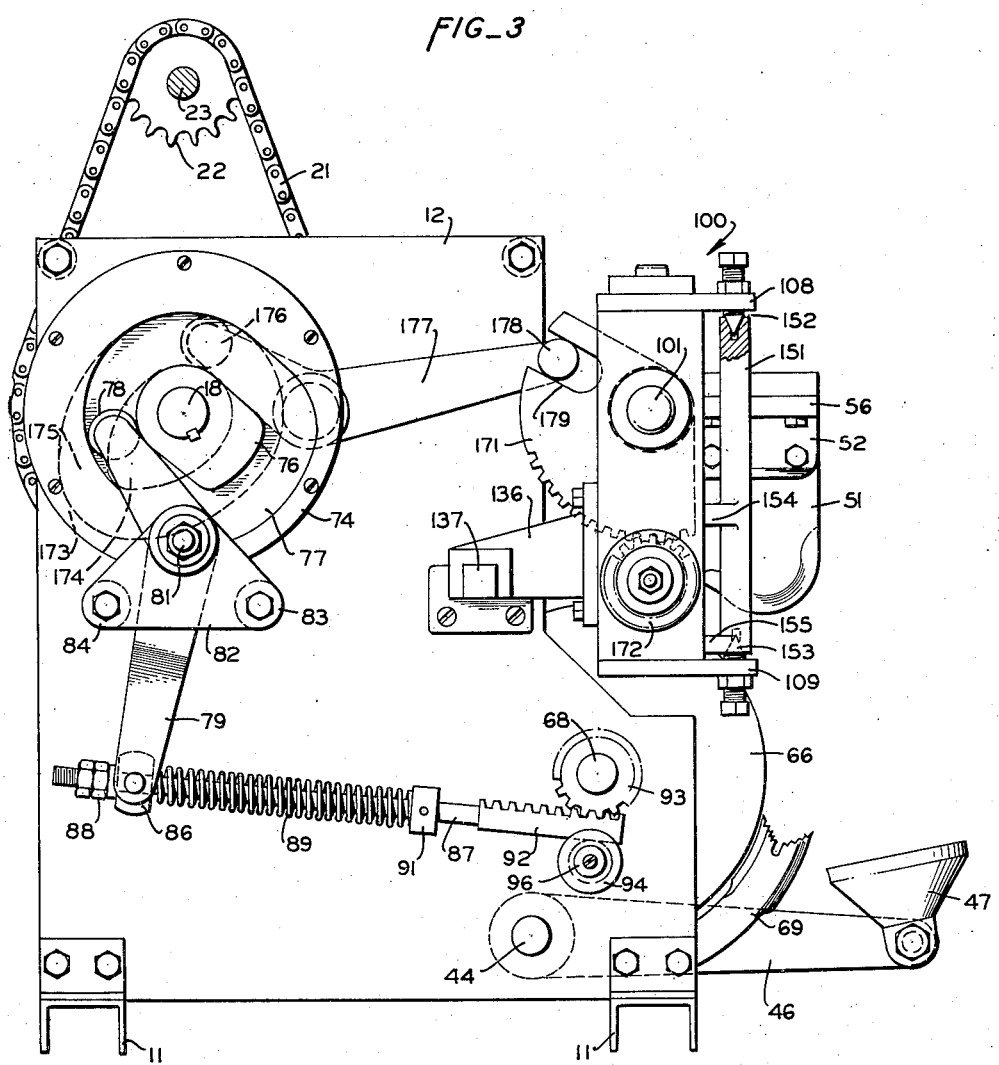

Jan. 10, 1961
L. W. WATERS
2,967,554
PEACH PITTER
Filed Feb. 21, 1957
6 Sheets-Sheet 4
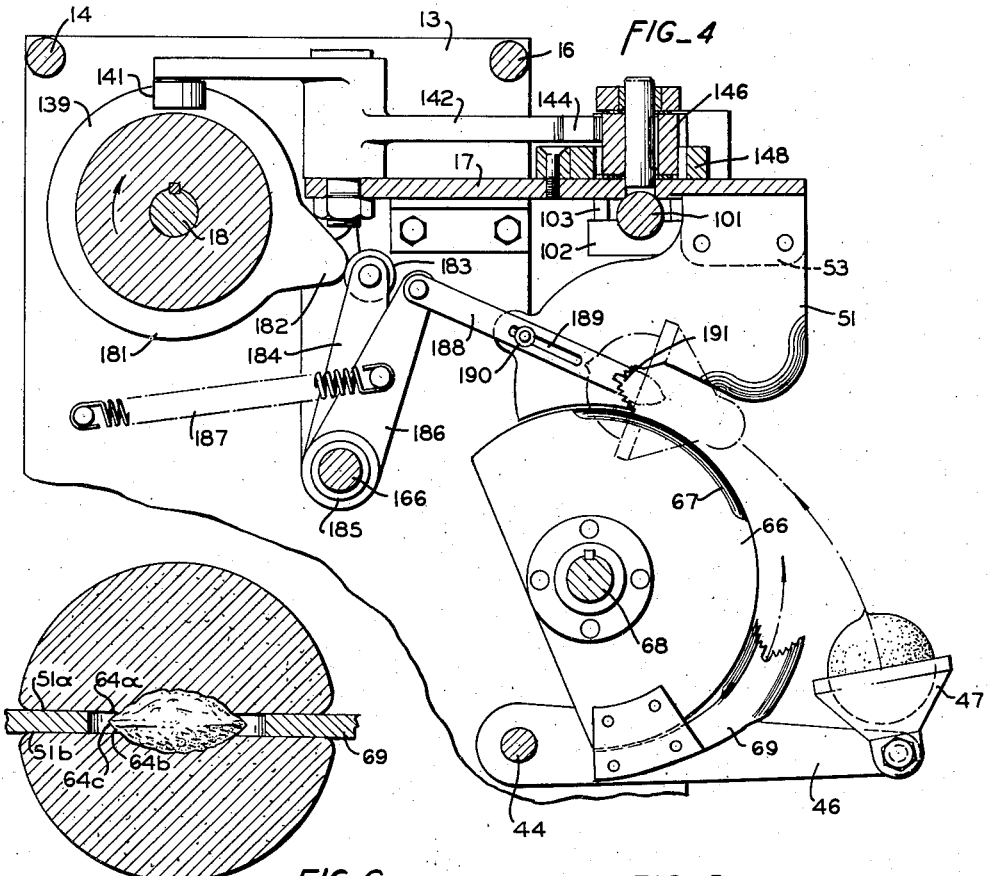
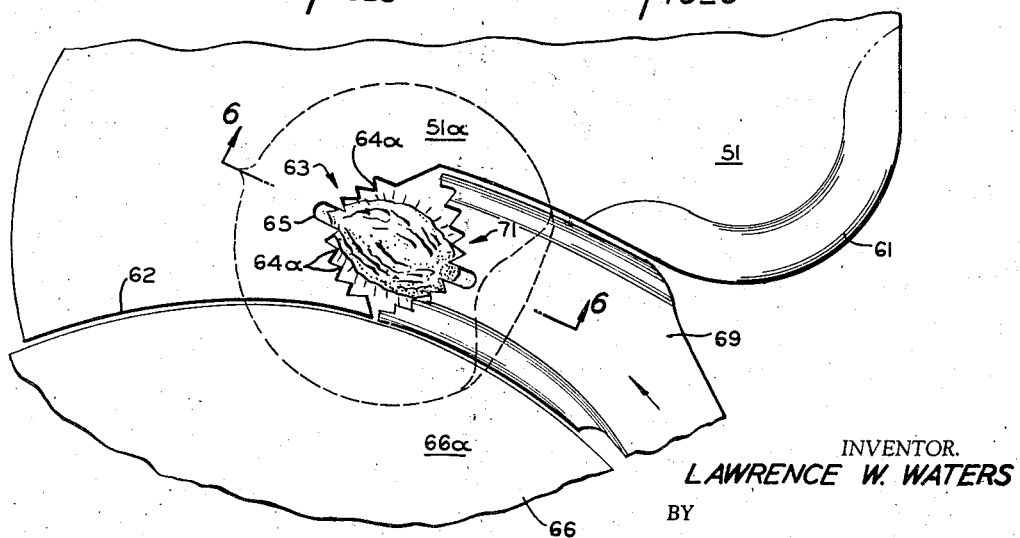
INVENTOR.
LAWRENCE W. WATERS
BY
*Meelin and Hansson*
ATTORNEYS

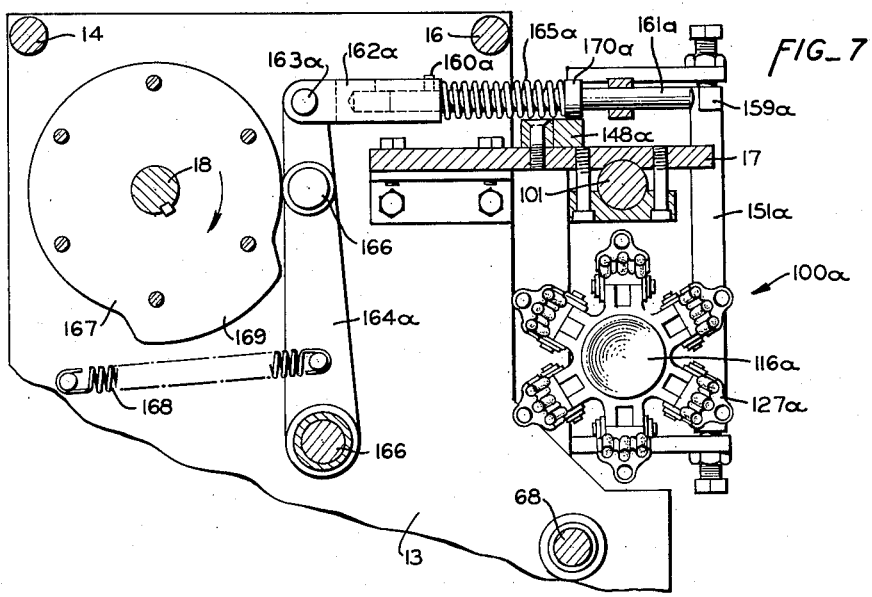
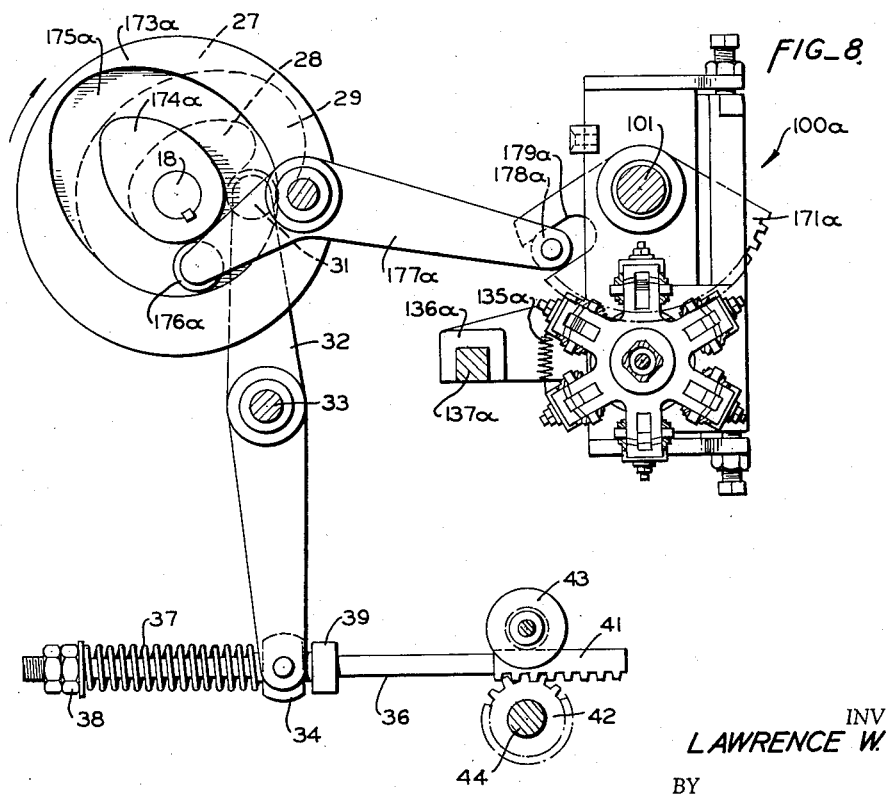

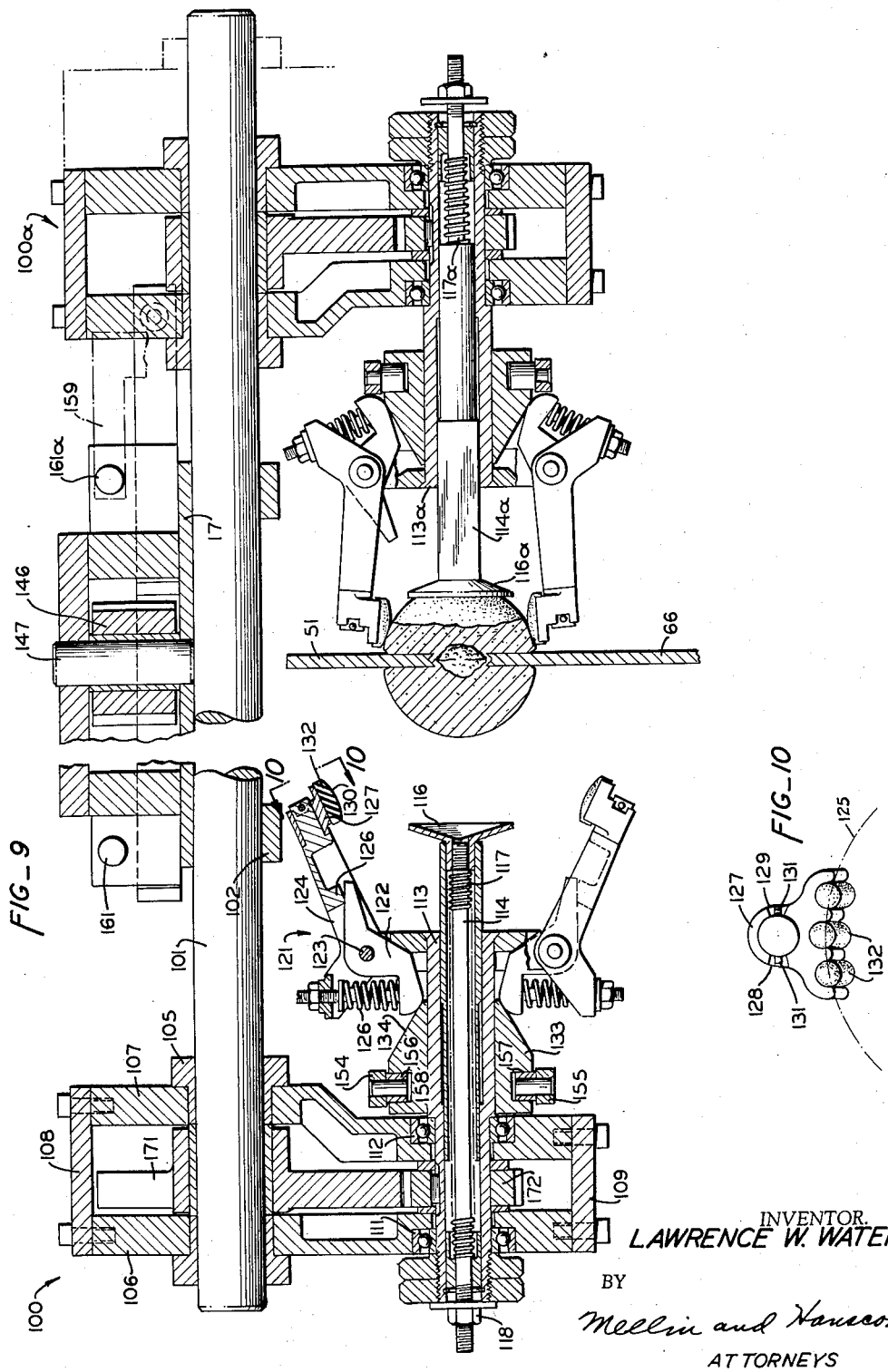

United States Patent Office 2,967,554
Patented Jan. 10, 1961

2,967,554

PEACH PITTER

Lawrence W. Waters, Fullerton, Calif., assignor to United Can and Glass Company, Hayward, Calif., a corporation of Delaware Filed Feb. 21, 1957, Ser. No. 641,713

6 Claims. (Cl. 146—28)

This invention relates to a pitter for peaches or the like, and more particularly to a device for feeding peaches to a halving device in which the peach is gripped by the pit and the halved flesh is twisted from the pit.

It is a principal object of this invention to provide a peach pitter with a pit gripping means to grip the pit by the flower and stem ends thereof, whereby the pit may be held while the flesh of the peach is rotated relative to the pit to disengage the flesh from the pit.

It is a further object of the invention to provide a peach pitting machine with a pair of coplanar knife members having complementary mating edges and in which the mating edges have pit receiving notches formed therein, the notches being of such a shape and size as to engage only the flower and stem ends of the peach pit when the knife members close together to bisect the peach.

A yet further object of the invention is to provide a peach pitting machine with a pair of coplanar knife members having complementary mating edges, and having opposed pit receiving notches formed therein of a shape and size to grip the stem and flower ends of a peach pit when the knife members close to bisect the flesh of the peach, and, in addition, to provide gripping means to grip the halves of the bisected peach and to twist the gripped halves relative to the pit to disengage the flesh of the peach from the pit thereof.

It is a further object of the invention to provide a method of pitting peaches whereby the pit of the peach is gripped at the stem and flower ends thereof and in which the flesh is bisected around the pit in the suture plane of the peach, the bisected halves being then gripped and twisted about an axis extending through the pit and perpendicular to the suture plane of the peach.

In the past it has been common to grip a peach pit in the suture plane and on opposite sides thereof intermediate the stem and flower ends of the pit so that succeeding operations might then be carried out. This manner of gripping has been found to be objectionable because such gripping requires a considerable amount of force, and such force is applied to the pit at a point where it is relatively weak. As a consequence, it has been found that the gripping force necessary to hold the pit will often times split the pit during the pitting operation. Such splitting will either cause the mechanism to then jam, or the pit simply will not be removed from the peach halves, either of which results is highly objectionable.

It has been discovered that the surface veins on a peach pit extend generally from one end to the other, and are relatively widely spaced at the mid point of the pit. At the ends, however, such veins fuse together, or become very closely spaced, with a consequent increase in strength of the pit. It was then discovered that this greater end strength of the pit enables the pit to withstand a far greater compressive force applied to the ends of the pit than when such a compressive force is applied to the pit at the mid point thereof, and the machine disclosed herein was developed to take advantage of this greater pit end strength to overcome objectionable splitting of the peach pits during a pitting operation.

Other objects and advantages of the invention will become apparent in the course of the following detailed description.

In the accompanying drawings, forming a part of this application, and in which like numerals are used to designate like parts throughout the same, Fig. 1 is a top plan view of an embodiment of the invention.

Fig. 2 is a front elevational view of the embodiment of Fig. 1.

Fig. 3 is a left-hand side elevational view of the embodiment of Fig. 1.

Fig. 4 is a longitudinal cross-sectional view of the invention taken along line 4—4 of Fig. 1.

Fig. 5 is a detail of Fig. 4, on an enlarged scale, showing the pit of a peach held by the interengaging knife members.

Fig. 6 is a cross-sectional view taken along line 6—6 of Fig. 5.

Fig. 7 is a partial longitudinal cross-sectional view taken along line 7—7 of Fig. 1.

Fig. 8 is a longitudinal cross-sectional view taken along line 8—8 of Fig. 1.

Fig. 9 is a transverse cross-sectional view taken along line 9—9 of Fig. 1.

Fig. 10 is a detail of one of the peach gripper arms, taken along the line 10—10 of Fig. 9.

Generally, the machine is provided with a peach holding cup adapted to receive a peach oriented therewithin by an operator. The cup is then actuated to move the peach into engagement with a pair of complementary knife members, with one end of the pit being engaged by a pit holding means. The cup is then retracted and the knife members are fully closed, with the other end of the pit being clamped into place. In closing, the knife members bisect the flesh of the peach in the suture plane thereof, i.e., in the plane defined generally by the suture of the peach and the center of the pit. Gripping members, mounted on opposite sides of the knife members, move into gripping engagement with the bisected halves of the peach, and are then rotated to sever the peach halves from the gripped pit. The gripping members are then opened to release the peach halves, and the knife members are moved to open position. A pit knockout member is then actuated to knock the pit free from the pit holding means if it had failed to fall therefrom by gravity.

Turning now to the specific embodiment of the invention, as illustrated in the drawings, the peach pitting machine 10 has a base 11, adapted to rest on any suitable support, and a pair of vertically disposed parallel frame members 12 and 13 fixed thereto. The upper ends of the frame members 12 and 13 are held apart by spacing rods 14 and 16, extending between the frame members. In addition, a horizontal shelf member 17 extends between frame members 14 and 16 and is affixed thereto by suitable means.

A horizontally extending camshaft 18 is rotatably journaled in frame members 12 and 13 and carries thereon sprocket 19 to receive a continuous drive through endless chain 21 driven by sprocket 22 mounted on a power drive shaft 23. Suitable means (not shown) are provided to continuously rotate drive shaft 23, and thus camshaft 18.

Keyed to camshaft 18 is a circular plate member 26 having cam track members 27 and 28 fixed to one face thereof. These cam track members define a parallel walled cam track 29, shown in dotted lines in Fig. 8, to receive a cam follower roller 31 mounted on the upper end of lever 32. As the plate member 26 rotates, the cam roller 31 will follow the cam track 29 to oscillate lever 32 about a pivot pin 33 fixed to frame member 13.

Pivotally fastened to the lower end of lever 32 is a collar 34 slidably mounted on shaft 36. A compression spring 37 surrounds shaft 36 and abuts collar 34 and adjustment nut 38. Shoulder 39 limits movement of collar 34 away from the adjustment nut end of shaft 36.

Shaft 36 terminates in a rack portion 41, maintained in mesh with pinion gear 42 by a double flanged roller guide member 43.

The reciprocatory movement of rack 41 is thus translated into oscillatory movement of pinion gear 42 and shaft 44 on which it is mounted. Shaft 44 is journaled for rotation in frame members 12 and 13 and carries therebetween crank arm 46 extending forwardly therefrom. The forward end of crank arm 46 has affixed thereto the peach receiving cup member 47, which is slotted at 48 for reasons which will become apparent.

The upper knife member 51 is bolted to oppositely facing L-shaped brackets 52 and 53, the legs of which are received within a groove 54 formed on the bottom of shelf 17 and extending from front to rear centrally thereof to allow adjustment of the knife member relative to the frame shelf 17. Depending brackets 56 and 57, fixed to shelf 17, form a channel engaging the legs of brackets 52 and 53, and bolts 58 and 59 enable the brackets 56 and 57 to be tightened on the knife supporting brackets 52 and 53 after these brackets have been adjusted to a desired position in groove 54.

As seen in Fig. 4, knife member 51 has an outwardly curving arcuate cutting edge 61 on the front edge thereof and an inwardly curving arcuate edge 62 on the rear edge thereof. Intermediate the front and rear edges of the knife member 51 is formed the pit receiving notch 63 having a generally V-shape and being provided with pairs of serration, or teeth, 64a and 64b, along each side face of the knife member 51. As shown in Fig. 6, these pairs of teeth are formed with the outwardly extending points thereof being coplanar with the side faces 51a and 51b of the knife member 51, the inwardly extending sides of the teeth forming a V-groove 64c. In this manner the teeth 64a and 64b may bite into the opposite side faces of the pit with the edge or ridge of the pit resting in the V-groove 64c. In this manner the pit is gripped so as to avoid any possibility of splitting the pit. In addition, if the pit were already split, the teeth 64a and 64b will exert a force directed inwardly of the sides of the pit to hold the halves of the pit together, so as to eliminate the misfunctioning of the machine due to such split pits. The bottom of the notch 63 is cut away at 65 forming a slot to receive the normally pointed end of the peach pit.

The lower knife member 66 has side faces 66a and 66b, coplanar with side surfaces 51a and 51b of knife member 51, and is generally semicircular in shape and of a curvature complementary with the inwardly curving rear portion 62 of knife member 51. A cutting edge 67 is formed along a portion of the outer edge of the knife member 66.

Knife member 66 is keyed to shaft 68, journaled for rotation in upright frame members 12 and 13, so that as shaft 68 is rotated, the lower knife member 66 will move in relation to the upper knife member 51, and the pit engaging member 69 fixed to the lower knife member will rotate into and out of mating relation with the notch 63 of the upper knife member 51.

The pit engaging member 69 has a serrated pit receiving notch 71 identical to notch 63, so that when the notches 71 and 63 are brought together, they form a generally diamond shaped hole through the complementary knife members 51 and 66. In order that only the flower and stem ends of the pit will be gripped by the serration of the pit receiving notches 63 and 71, the hole formed by the notches is dimensioned so that base dimension of the notches will be greater than the normal minor axis of a peach pit as taken in its suture plane, and the distance between apices of the notches will be less than the major diameter of such a peach pit. Thus, the only portions of the pit which can be held by the pit receiving notches will be the flower and stem ends of the pit.

In operation, the operator will place a peach within the cup 47, with the suture line of the peach being aligned with the slot 48 of the cup, and with the flower end of the peach facing upwardly. The crank arm 46 will carry the cup from the loading position, shown in solid lines in Fig. 4, to the position shown in dotted lines of that figure, wherein the peach is forced against the cutting edges 61 and 67 of the upper and lower knife members, respectively, so that the peach is partially bisected thereby. The flower end of the pit is forced into engagement with the serration of pit receiving notch 63, with the slot 48 of cup 47 allowing the cup to straddle the knife members.

The cup is returned to its normal position and the lower knife member 66 is rotated by shaft 68 so that the notch 71 is brought into engagement with the stem end of the pit to hold the pit at the other end thereof. As the notches 63 and 71 are serrated around the peripheries thereof, the pit can be somewhat cocked from a line extending from the centers of notches 63 and 71 and still be held only by its ends. As shown in Fig. 5, with the knife members 51 and 66 in closed position, the flesh of the peach will be bisected in the suture plane thereof, completely around the pit.

The lower knife member shaft 68 is oscillated in a similar manner as is the cup shaft 44. A second circular plate member 73 is keyed to the main camshaft 18, and has cam track members 74 and 76 fixed to one face thereof. These cam track members define a parallel walled cam track 77, shown in Fig. 3, to receive a cam follower roller 78 mounted on the upper end of lever 79. As the plate member 73 rotates, the cam roller 78 will follow the cam track 77 to oscillate lever 79 about a pivot pin 81 fixed to bracket 82 fastened by bolts 83 and 84 to frame member 12. The lower end of lever 79 has pivotally fastened thereto collar member 86 slidably mounted on shaft 87, and confined against adjustment nuts 88 by compression spring 89 acting against shoulder 91 of shaft 87.

Shaft 87 terminates in rack member 92 held in meshing engagement with pinion gear 93, fixed to lower knife member shaft 68, by a double flanged roller guide member 94 rotatably mounted on pin 96 fixed to frame member 12.

As will be noted, both the cup arm 46 and lower knife member 66 are both spring loaded in that the cup arm actuating lever shoe 34 and lower knife member actuating lever shoe 86 act against the respective compression springs 37 and 89 to move the cup 47 and lower knife member pit engaging member 69 upwardly, so that if a somewhat larger pit is encountered, the compression springs will allow the cup and pit engaging members to stop their rotation even though their actuating levers 32 and 79 are still rotating by the impetus of their respective cam followers.

After the peach has been impaled on the knife members 51 and 66, with the pit being held at its ends by the serrated pit receiving notches 63 and 71, the peach grippers move to grip the bisected peach halves and to twist the halves from the pit. The peach gripping and twisting means are shown as carried by carriages 100 and 100a. As each peach gripping and twisting means is identical to the other, only the left-hand means will be described, with the corresponding part of the right-hand means being identified by the same reference numeral with a subscript "a" affixed thereto.

Both of the gripping and twisting carriage means 100 and 100a are mounted for longitudinal sliding movement on a horizontal shaft 101 mounted beneath shelf 17 and clamped thereto by support blocks 102 and bolts 103.

The gripping and twisting means comprises a sleeve 105 loosely mounted on shaft 101 and carrying vertically extending carriage frame members 106 and 107, these being connected at top and bottom by carriage frame members 108 and 109. Anti-friction bearings 111 and 112 support tube member 113 for rotatable movement with respect to the carriage 100. Rod 114 extends through tube 113, and is provided with a pressure pad head 116. Compression spring 117 provides a rightward bias to rod 114, the rod being limited in its rightward movement by the engagement of stop nut 118 threaded on the left end of rod 114. Stop nut 118 also enables the bias of spring 117 to be adjusted. When the carriage 100 moves from the position as shown in Fig. 9 the position as shown by carriage 100a of that figure, the pressure pad 116a will contact the peach to force the peach against the engaged knife members, the pressure pad 116a being forced against the peach by the bias of spring 117a acting on the pressure pad rod 114a.

The right end of tube member 113 carries six peach gripping fingers 121, each comprising a Z-shaped lever 122 pivoted intermediate the ends thereof to tube member 113 by pin 123. Also mounted on pin 123 is a second lever 124 pivoted intermediate its ends. A compression spring 126 provides a spring loading of the gripping fingers and extends between one of lever 122 and one end of lever 124, the levers being prevented from moving under this spring bias by the engagement of projection 126 on lever 124 with the other end of lever 122.

Lever 124 carries at its end a peach gripping shoe 127 loosely mounted thereon. The portion of the shoe 127 encircling the end of the lever 124 has opposed cut-out portions 128 and 129 allowing limited rotative movement of shoe 127 around lever 124, such movement being limited by the engagement of the walls of the cut-out portions with pin 131 fixed to lever 124. Such limited rotative movement allows the gripping shoe to conform to the surface of the peach. Each shoe 127 is provided with three cylindrical rubber grippers 132, arranged with their axes in a parallel relation to each other and to the lever 124, and with their axes intersecting a concave line 125 normal thereto, to insure gripping of a peach by at least two of the rubber grippers 132. In addition, the peach contacting surfaces 130 of the grippers 132 are outwardly curved longitudinally thereof. This latter curvature will allow the grippers 132 to grip all sizes of fruit with an equal amount of contact between the grippers and the fruit, and will prevent any skin damage which would otherwise be due to sharp corners of conventional straight sided cylindrical grippers.

A collar 133 is mounted for longitudinal sliding movement on tube member 113, and has an inclined conical surface 134 engaging levers 122. As collar 133 moves to the right on tube member 113, the lever 122 will be forced in a clockwise direction, allowing spring 126 to move lever 124 in a clockwise direction into peach gripping position. When the peach has been gripped, further movement of lever 124 will be prevented, and further movement of lever 122 by collar 133 will merely increase the compression of spring 126.

Springs 135 are connected between the levers 124, as shown in Fig. 8, to urge the shoes 127 to their outward position when conical collar 133 returns to its starting position.

Bracket 136 is fastened to carriage 100 and has an inverted U-channel riding on a square rod 137 fixed to frame member 12 and extending horizontally outwardly therefrom to prevent swinging movement of carriage 100 forwardly or backwardly of the machine, The manner in which the carriage means 100 and 100a are reciprocated between the two operating positions as shown in Fig. 9 will now be described. Turning to Fig. 1, camshaft 18 has a cylindrical cam wheel 138 mounted thereon between frame members 12 and 13, the cam wheel 138 being provided with a cam track 139 to receive cam follower roller 141 mounted on one end of lever 142. Lever 142 is pivoted on pin 143 fixed to shelf 17 and is provided at its other end with great segment 144 in mesh with pinion gear 146 mounted on shaft 147 also fixed to shelf 17.

Pinion gear 147 is in meshing engagement with two racks 148 and 148a, these racks being connected to carriage frame members 107 and 107a, respectively. Thus, as lever 142 is oscillated by cam follower 141, the pinion gear 146 will oscillate, causing the racks 148 and 148a and carriages 100 and 100a to reciprocate in an equal and opposite manner.

Shaft 151 extends vertically of carriage 100 and is mounted for rotation about its axis on conical bearings 152 and 153, adjustably mounted on carriage frame members 108 and 109, respectively. The lower end of shaft 151 is provided with two crank arms 154 and 155, each having a lug 156 and 157, respectively, received within a groove 158 extending circumferentially of the conical collar 133.

The upper end of shaft 151 is provided with a crank arm 159, adapted to be engaged by shaft 161 when carriage 100 is moved inwardly towards the knife members 51 and 66. Shaft 161 is mounted for longitudinally slidable movement relative to shelf 17 and is received at its rear end within a bore hole in bifurcated member 162 which is pivotally connected at 163 to lever 164, the latter being pivotally mounted on shaft 166 extending transversely between frame members 12 and 13. Lever 164 carries thereon cam follower 166 which is held against cam 167, mounted on camshaft 18, under the influence of spring 168. The bifurcated member 162 is provided with a longitudinally extending slot 162' therethrough in registration with the bore hole to receive pin 160 extending radially from shaft 161, so as to enable the shaft 161 to have a limited amount of axial movement within the bore hole. Compression spring 165 confined between bifurcated member 162 and adjustable collar 170 on shaft 161 urges the shaft 161 forwardly, while acting as a take-up spring in case the forward stroke of shaft 161 is less than the forward stroke of the bifurcated member 162.

Shaft 161a, which actuates shaft 151a of carriage 100a, is shown, along with its actuating mechanism, in Fig. 7. As cam lobe 169a rotates, it will force lever 164a and and shaft 161a to the right. Shaft 161 will be moved in the same manner and at the same time. Such movement takes place when the carriages 100 and 100a have moved inwardly towards the gripped peach, and the crank arm 159 is in a position to be engaged by shaft 161. Shaft 161 forces the crank arm 159 to rotate shaft 151 and thus causes crank arms 154 and 155 to force the conical collar 133 in a direction to cause the gripping shoe 127 to close on the peach halves.

After the peach halves have been gripped, the following mechanism operates to rotate the tubular member 113 which carries the peach gripping elements.

Sleeve 105 carries thereon a gear segment 171 held between the carriage frame members 106 and 107, and in mesh with gear 172 keyed to tubular member 113, whereby oscillation of gear segment 171 will cause the gripping mechanism to oscillate.

Fixed to the other face of plate member 73, carried on camshaft 18, are two cam track elements 173 and 174, forming a parallel walled cam track 175 to receive cam follower roller 176 mounted on one end of lever 177 pivotally mounted intermediate its ends to frame member 12. The other end of lever 177 is provided with a horizontally extending shaft 178, which passes through the U-shaped slot 179 formed in gear segment 171. Shaft 178 is sufficiently long so as to permit movement of carriage 100 between its operating positions while maintaining shaft 178 in the slot 179 of gear segment 171 at all times. The cam track is adjusted so that oscillation of the gear segment 171, and consequently the gripping mechanism, is delayed until the peach has been gripped.

The mechanism for obtaining the twisting, or oscillation, of the gripping mechanism of carriage 100a is identical to that described, and the corresponding elements are denoted by the same reference numbers, with the subscript "a" affixed thereto.

After the gripping mechanism has been rotated to sever the flesh of the peach from the pit thereof, the severed peach halves are released and the gripping mechanisms move back to their original position, and the severed halves of the peach fall by gravity into a pan or onto a suitable conveyor belt (not shown). The lower knife member 66 rotates back to its original position, with the pit receiving notch 71 being removed from engagement with the peach pit, and the pit also falls from the knife members by gravity.

If the pit fails to fall from the upper knife member pit receiving notch 63, the following apparatus will knock the pit therefrom.

Cam 181, keyed to camshaft 18, has a cam lobe 182 engageable by cam roller 183 mounted on the upper end of crank arm 184. The lower end of crank arm 184 is fixed to sleeve 185 rotatably mounted on shaft 166. A second crank arm 186 is also fixed to sleeve 165, and spring 187 biases the double crank arm assembly 184, 185 and 186 towards cam 181. Two kick-out rods, 188 and 188a, are pivotally fastened to the upper end of crank arm 186, one on each side thereof. These rods are provided with slots 189 to permit longitudinal movement of the rod or pin 190 fixed to the upper knife member 51, and with kick-out ends 191 adapted to knock any pit from the serrations 64 of pit receiving notch 63. The cam 181 is adjusted on camshaft 18 so that the kickout operation occurs as the last step in a full cycle of operation.

From the foregoing detailed description, it is believed that the sequential operation of the machine has become obvious.

It is to be understood that the form of the invention herewith shown and described is to be taken as a preferred example of the same, and that various changes in the size, shape and arrangement of parts may be resorted to, without departing from the spirit of the invention, or the scope of the attached claims.

Having thus described my invention, what I claim and desire to secure by Letters Patent is:

1. In a machine for separating the flesh of a peach from the pit thereof, a pair of coplanar knife members having complementary mating edges, each of said knife members having a generally V-shaped pit receiving notch formed in said mating edge, said notches being opposed to one another when said knife members are in mated position to form a generally diamond shaped hole through said mated knife members, the base dimension of said V-shaped notches being greater than the smallest and less than the largest suture plane diameters of the pit of the peach upon which the machine operates, and the distance between apices of said notches being less than the largest diameter of said pit.

2. In a machine for separating the flesh of a peach from the pit thereof, a pair of coplanar knife members having complementary mating edges, each of said knife members having a generally V-shaped pit receiving notch formed in said mating edge, said notches each having a serrated surface, said notches being opposed to one another when said knife members are in mated position to form a generally diamond shaped hole through said mated knife members, the base dimension of said V-shaped notches being greater than the smallest and less than the largest suture plane diameters of the pit of the peach upon which the machine operates, and the distance between apices of said notches being smaller than the largest suture plane diameter of said pit, whereby a peach pit disposed within said notches and with the pit ends coplanar with said knife members will be held by the engagement of said serrations with the ends of said pit.

3. In a machine for separating the flesh of a peach from the pit thereof, a pair of coplanar knife members mounted on a support and having complementary mating edges, each of said knife members having a generally V-shaped pit receiving notch formed in said mating edge, said notches being opposed to one another when said knife members are in mated position to form a generally diamond shaped hole through said mated knife members, the base dimension of said notches being greater than the smallest and less than the largest suture plane diameters of the pit of the peach upon which the machine operates, and the distance between apices of said notches being smaller than the largest diameter of said pit, means mounted on said support to hold a peach with the suture plane thereof coplanar with said knife members, means to move said holding means toward one of said knife members to impale said peach on said knife member with one end of the pit of said peach in engagement with the bottom of the pit receiving notch thereof, and means to move the other of said knife members into mating engagement with said one knife member whereby the other end of said pit is engaged by the bottom of the pit receiving notch of said other knife member.

4. In a machine for separating the flesh of a peach from the pit thereof, a pair of coplanar knife members mounted on a support and having complementary edges, each of said knife members having a generally V-shaped pit receiving notch formed in said mating edge, said notches being opposed to one another when said knife members are in mated position to form a generally diamond shaped hole through said mated knife members, the base dimension of said notches being greater than the smallest and less than the largest suture plane diameters of the pit of the peach upon which the machine operates, and the distance between apices of said notches being smaller than the largest diameter of said pit, means mounted on said support to hold a peach with the suture plane thereof coplanar with said knife members, means to move said holding means toward one of said knife members to impale said peach on said knife member with one end of the pit of said peach in engagement with the bottom of the pit receiving notch thereof, means to move the other of said knife members into mating engagement with said one knife member whereby the other end of said pit is engaged by the bottom of the pit receiving notch of said other knife member, a pair of rotatable peach gripping elements mounted on said support and disposed on opposite sides of the plane of said knife members, means to move said gripping elements into gripping engagement with the flesh of said peach, and means for rotating the gripping elements and the gripped flesh of the peach relative to said knife members about an axis extending through said pit perpendicular to said knife members.

5. In a machine for separating the flesh of a peach from the pit thereof, a pair of coplanar knife members mounted on a support and having complementary mating edges, said knife members having a generally V-shaped notch in each mating edge and being oppositely disposed for gripping the pit of a peach being acted upon, said notches being of a size that when said knife members are mated the distance between the apex of each V is less than the major diameter of said pit being acted upon and the length of the base dimension of each V is greater than the smallest and less than the largest suture plane diameters of said pit being acted upon.

6. In a machine for separating the flesh of a peach from the pit thereof, a pair of coplanar knife members mounted on a support and having complementary mating edges, said knife members having a generally V-shaped notch in each mating edge and being oppositely disposed for gripping the pit of a peach being acted upon, said notches being of a size that when said knife members are mated the distance between the apex of each V is less than the major diameter of said pit being acted upon and the length of the base dimension of each V is greater than the smallest and less than the largest suture plane diameters of said pit being acted upon, and said knife members having a slot formed at the apex of each V-shaped notch for receiving the normally pointed end of said pit.

References Cited in the file of this patent

UNITED STATES PATENTS

| | | |
|---|---|---|
| 596,343 | Topp | Dec. 28, 1897 |
| 1,755,872 | Gottelli | Apr. 22, 1930 |
| 1,785,006 | Duncan | Dec. 16, 1930 |
| 2,056,848 | Giesinger | Oct. 6, 1936 |
| 2,531,927 | Waters | Nov. 28, 1950 |
| 2,594,362 | Skog | Apr. 29, 1952 |
| 2,664,127 | Perrelli | Dec. 29, 1953 |
| 2,799,311 | Waters | July 16, 1957 |